N. CHAPIN.
Churn.
No. 5,560.
Patented May 9, 1848.
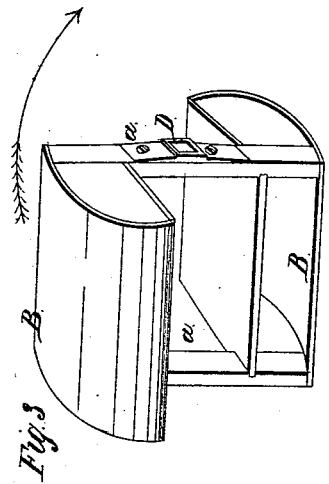
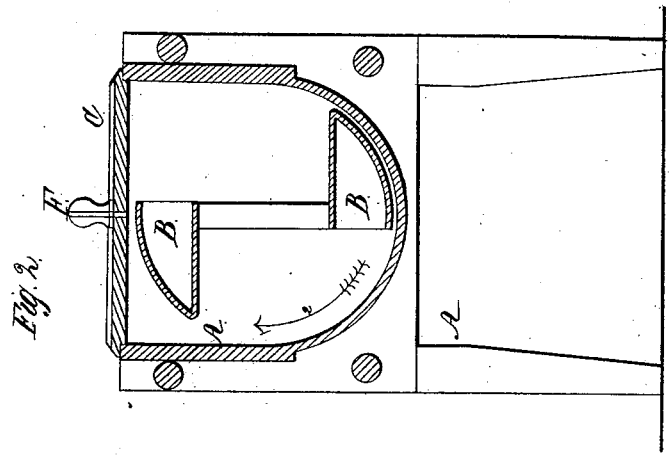
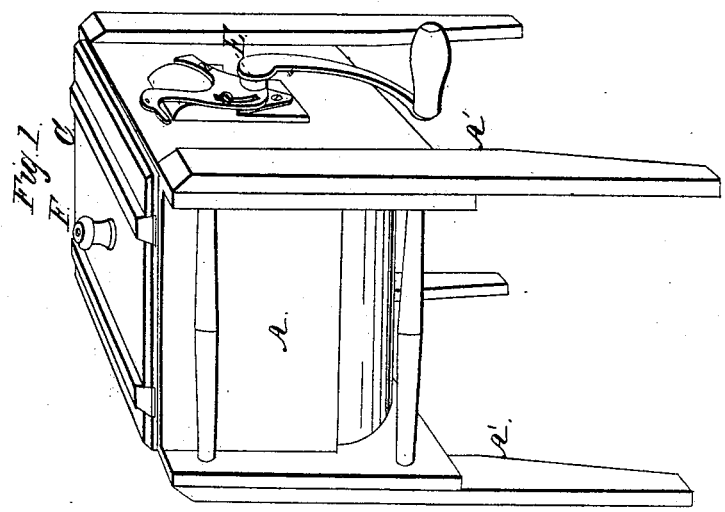

UNITED STATES PATENT OFFICE.

NATHAN CHAPIN, OF CORTLANDTVILLE, NEW YORK.

ATMOSPHERIC CHURN.

Specification forming part of Letters Patent No. 5,560, dated May 9, 1848; Reissued May 15, 1849, No. 137.

*To all whom it may concern:*

Be it known that I, NATHAN CHAPIN, of Cortlandtville, in the county of Cortlandt and State of New York, have invented a new and useful Improvement in Churns for Making Butter, called "Chapin's Atmospheric Churn," which is described as follaws, reference being had to the annexed drawings of the same, making part of this specification.

Figure 1, is a perspective view of the "atmospheric churn." Fig. 2, is a section through the center of the same. Fig. 3, is a perspective view of the buckets, detached from the churn.

Similar letters in the figures refer to corresponding parts.

The nature of this invention consists in arranging within a suitable box or case, in which the cream is placed, two or more buckets secured to horizontal journals and revolving with the same, in such a manner in relation to the surface of the cream, as to alternately carry at each revolution, a body of air with them below its surface and to release the same near the bottom of the case, and allow it to ascend in bubbles through the cream to the space above the same, and to convey a quantity of cream above said surface, and discharge it from the buckets into the space above, near the top of the case, thus causing the fatty substances of the cream to be brought into frequent contact with the oxygen of the atmosphere, and speedily formed into butter.

A is the box or case in which the cream is placed, made semi-circular on its lower part, and vertical on its sides and ends, and secured in a suitable frame A'.

B are the revolving buckets secured to the extremities of parallel arms *a*, revolving on horizontal journals at their centers. These buckets are made of the form of a segment of a circle on their outer sides in order that those sides may correspond with the curvature of the lower part of the case when revolved over the same and are made straight on their inner sides and ends; the remaining sides, parallel with the arms, being left open.

C is a movable cover placed over the case for preventing the escape of the cream, or the entrance of dust, during the operation of churning, having a handle for moving the same, and perforated with an opening for the entrance of air.

D is a cast plate secured to the center of one of the parallel arms, and having a projection on its outer side in which is formed a square or oblong cavity for the reception of the corresponding formed end of the horizontal journal.

E is the horizontal axle mentioned above, turning in a box in the frame and provided with a crank for giving motion to the buckets, and having a neck or groove near its outer end, outside the frame, in which is inserted the concave part of a curved plate or lever, turning on a pin, on the outside of the frame, and held in its place and guided by a slot and screw in such a manner as to allow the operator to detach the plate or lever, and withdraw the journal, and remove the buckets and arms from the churn, when desired.

F is an aperture in the center of the lid for the admission of air. The arrows 2 and 3 indicate the direction of the movement of the buckets.

When it is desired to form butter with this churn, the case or box is filled with cream to a point a short distance above the level of the journals. The buckets are then revolved in the direction in which their open sides face, causing their said open parts to strike the surface of the cream nearly parallel, and the air contained in them to be carried below the surface and discharged into the cream, and to ascend through the same in the form of globules, and the cream to be raised by the buckets, in their ascent, and discharged into the air in the space above—thus bringing the oxygen of the air in continual, and frequent contact with the fatty substances of the cream, by which they are incorporated readily into a solid mass in the form of butter.

I do not claim to be the inventor of a box churn with a revolving paddle wheel closed by a lid having one or more apertures in the same for the purpose of admitting air for promoting the operation of churning—but What I do claim as my invention and desire to secure by Letters Patent is—

Forming the paddles of the revolving wheels with buckets of the peculiar shape above described for the purpose of raising the cream nearly to the top of the churn, and discharging it through the air therein admitted through the aperture in the lid as well as breaking up the cream by the revolving of the buckets through the cream by which the butter is produced in a very short period of time. Said buckets conveying the air to near the bottom of the churn, and discharging it through and amongst the cream by which the oxygen of the air is brought into close contact with the fatty substances of the cream and by which they are caused to incorporate readily into a solid mass in the form of butter as herein fully set forth.

In testimony whereof I have hereunto signed my name before two subscribing witnesses, this 5th day of February, 1848.

NATHAN CHAPIN.

Witnesses:
WM. P. ELLIOT,
A. E. H. JOHNSON.

[FIRST PRINTED 1913.]